United States Patent [19]
Ramirez

[11] Patent Number: 5,531,054
[45] Date of Patent: Jul. 2, 1996

[54] REINFORCED WOODEN WALL

[76] Inventor: Jose G. Ramirez, 2-½ Moorefield Rd., Mission, Tex. 78572

[21] Appl. No.: 257,371

[22] Filed: Jun. 9, 1994

Related U.S. Application Data

[63] Continuation of Ser. No. 979,137, Nov. 20, 1992, abandoned.

[51] Int. Cl.$^6$ .............................. E04H 9/14; E02D 27/50
[52] U.S. Cl. ............................ 52/741.1; 52/95; 52/293.1; 52/223.7; 52/DIG. 11
[58] Field of Search ........................... 52/23, 295, 726.1, 52/DIG. 11, 227, 668, 669, 293.1, 223.7, 266, 271, 270, 741.1

[56] References Cited

U.S. PATENT DOCUMENTS

| | | | |
|---|---|---|---|
| 573,452 | 12/1896 | Delahunt | 52/92.2 |
| 2,373,409 | 4/1945 | Myer | 52/293.1 |
| 3,820,293 | 6/1974 | Ohe et al. | 52/223.7 |
| 4,688,362 | 8/1987 | Pedersen et al. | 52/223.7 |
| 4,726,567 | 2/1988 | Greenberg | 52/223.7 |
| 4,817,353 | 4/1989 | Woods et al. | 52/295 |
| 5,384,993 | 1/1995 | Phillips | 52/92.2 |

*Primary Examiner*—Darnell M. Boucher
*Attorney, Agent, or Firm*—Gunn, Lee & Miller

[57] ABSTRACT

A method for reinforcing building structures so they may withstand strong winds. The method involves installing vertical tie rods to bolts anchored in the foundation of the building structure. The rods tie the horizontal beams, such as ceiling joists of the building structure, to the anchor bolts through nuts and washers secured to the removed end of the anchored tie rod.

6 Claims, 10 Drawing Sheets

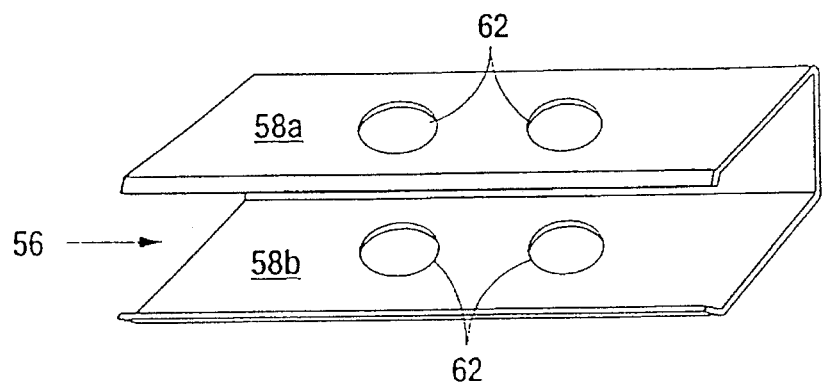
Fig. 5B
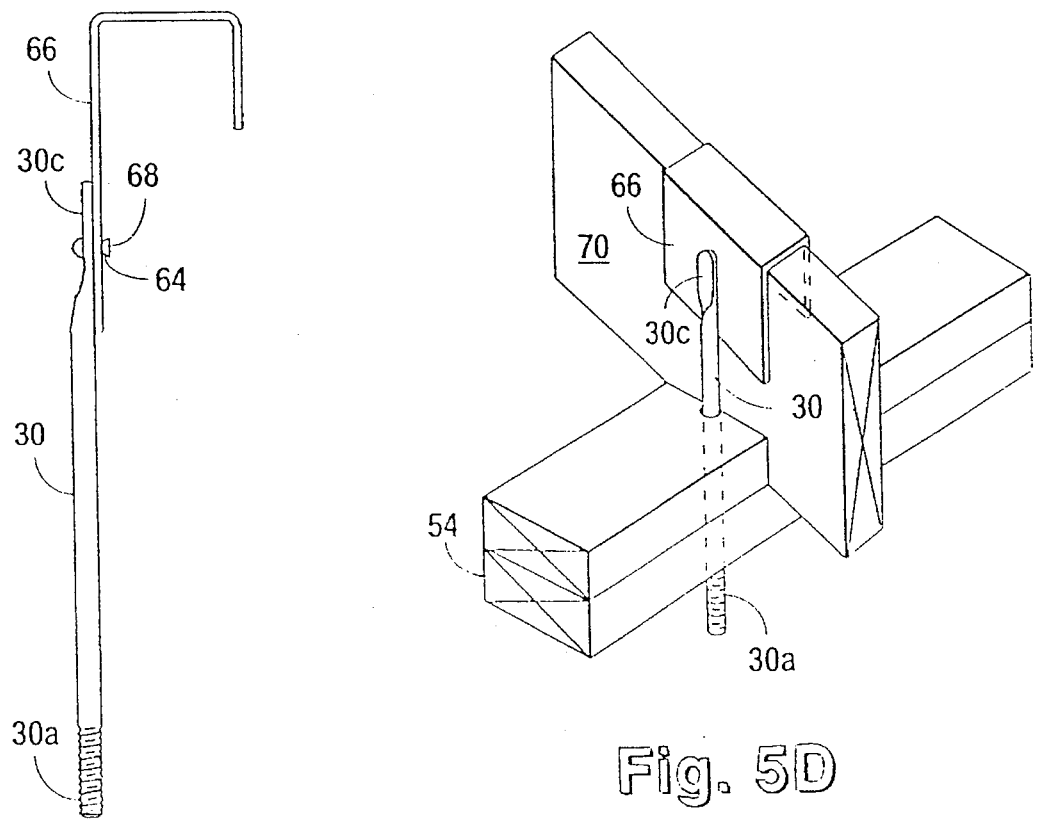
Fig. 5C
Fig. 5D

REINFORCED WOODEN WALL

This application is a continuation of application Ser. No. 07/979,137, filed Nov. 20, 1992, now abandoned.

FIELD OF THE INVENTION

The field of the invention is reinforcing building structures, more specifically, a method for reinforcing building structures using a series of vertically aligned rigid metal rods tied to anchor bolts in the foundation and secured to the top surfaces of the ceiling joists of the building structures.

BACKGROUND

Storms, hurricanes, typhoons, tornadoes and the like are devastating to building structures. In the United States, wind damage to building structures amounts to millions of dollars each year in losses. Indeed, Hurricane Andrew struck Florida a few months prior to the filing date of this application and caused damages estimated to be in excess of $100 million to residential homes alone. However, even in the areas of heaviest damages, where wind speeds exceeded 150 knots, certain more stoutly-built structures withstood the winds far better than others.

Much of the wind damage to building structures occurs at a "weak link" of the building structure, that weak link being the juncture of the horizontal beams, such as ceiling joists or the like, with the vertical support structures (either vertical wood posts or concrete blocks). These nail-secured joints securing one piece of wood to another are very effective in preventing shear or compression forces from dislocating the joined pieces of wood. However, if strong winds cause tension forces, the nails are less successful and the boards are more apt to separate with significantly less force than that required to separate the boards with shear or compressive forces.

Unfortunately, while a building structure buffeted by a strong wind is subject to many forces—compression, shear, torsional and tension forces—it is all too common that ceiling joists, especially those separating the ceiling of a structure and the roof are commonly subject to high tensile forces. This results from the wind blowing at a high speed over a pitched roof with a resulting venturi effect causing a low pressure over the top curve (i.e., the pitched roof) compared to the pressure inside the building structure. Thus, roofs can and do literally lift off the tops of the buffeted building structure, separating from the building by the lifting force often at the roof line. Beams securing the ceiling to the vertical support beams are subject to separation through the application of high tensile forces generated by the wind. Once the roof is lifted or weakened, the walls often collapse due to forces perpendicular to the vertical wall surfaces and the impact of the wind against the now unsupported walls.

Applicant, inventor of the present invention, provides a means for reinforcement of building structures to better withstand high winds.

Thus, it is the object of the present invention to provide a method of reinforcing building structures by installing means to increase the resistance of beams to separation under tensile forces.

This and other objects provided for by installing Applicant's rigid metal tie rods from the foundation of the building structure to extend vertically upward and through ceiling joists or horizontal beams, affixing the tie rod to the top surface of the beams thereby anchoring it to the foundation with a threaded tie rod.

SUMMARY OF THE INVENTION

Applicant's invention provides a method for reinforcing building structures which have foundations in which anchor bolts are secured. The method provides a vertical rigid metal tie rod threaded onto the anchor bolt at a first end, the rigid metal tie rod extending vertically upward within the walls of the building structure and perpendicular to the lintels, horizontal beams and ceiling joists thereof. A washer and nut at the removed end of the tie rod secures it to the top surface of the ceiling joists. In this manner, tension forces applied to the secured beams are transmitted through the tie rods to the anchor bolts in the foundation, thus, significantly strengthening the building structure to the forces generated by high winds and the like.

BRIEF DESCRIPTION OF THE FIGURES

FIG. 5b is a symmetric view of the brace of Applicant's invention as shown in FIG. 4a.

FIG. 5c is a side elevational view of an alternate method for attaching the tie rod to a roof joist.

FIG. 5d is a symmetric detailed view of the alternate method for attachment shown in FIG. 4c.

DETAILED DESCRIPTION OF THE PREFERRED EMBODIMENT

Figure 1A:
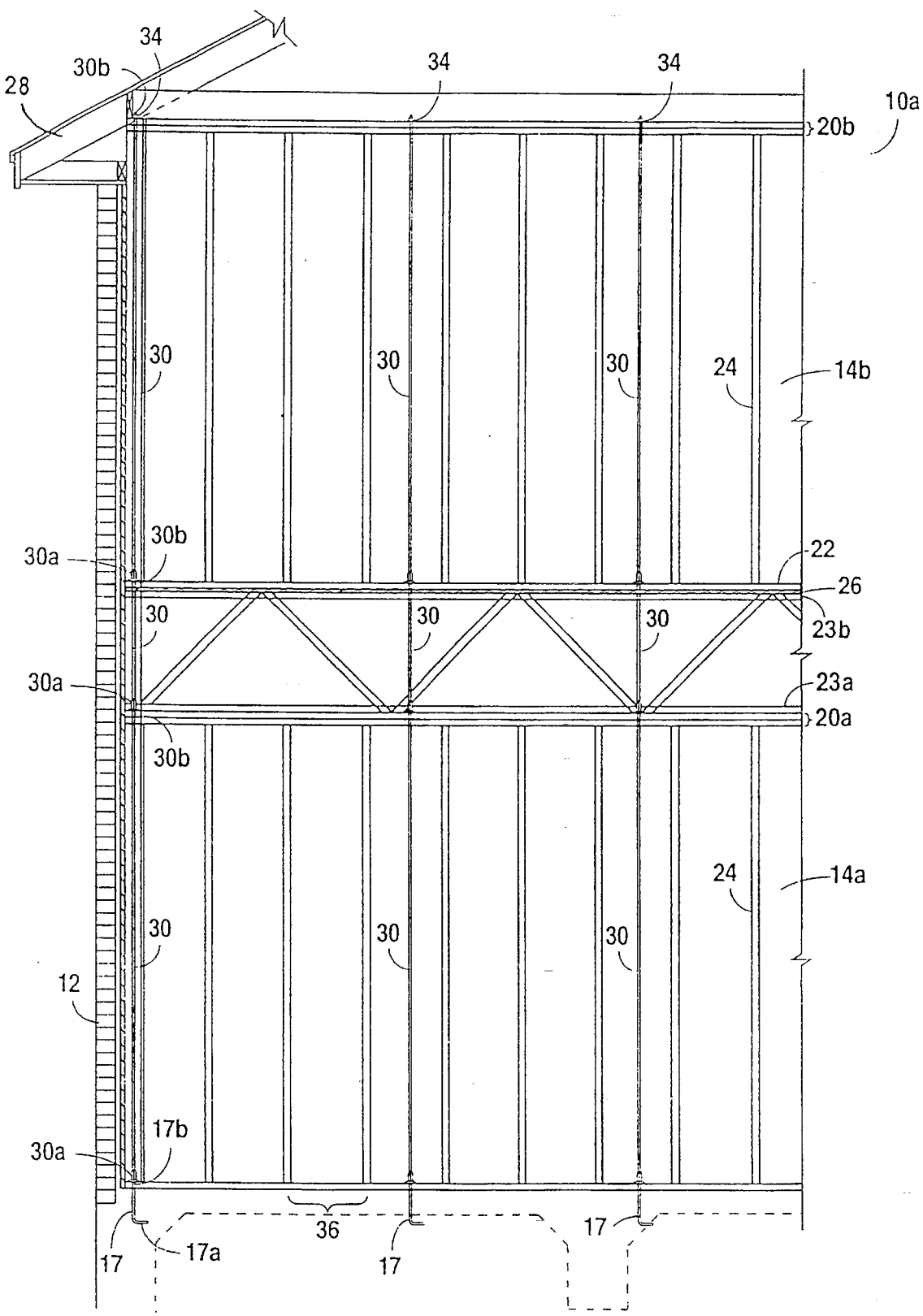
FIG. 1a is a side elevation cut-away view of a typical residence structure.

FIGS. 1a–d illustrate the method of the preferred embodiment of the present invention as adapted to a two-story wood frame building (10a) and a one-story wood frame building (10b).

Turning now to buildings (10a) and (10b), general features may be viewed as follows. Typical brick and wood stud wall (12) may be found on both buildings (10a) and (10b). Typical wood stud walls (14a), well known in the art, define a first story of building structures (10a) and (10b). Typical wood stud walls (14b), also well known in the art, define a second story of building structure (10a).

Figure 1D:
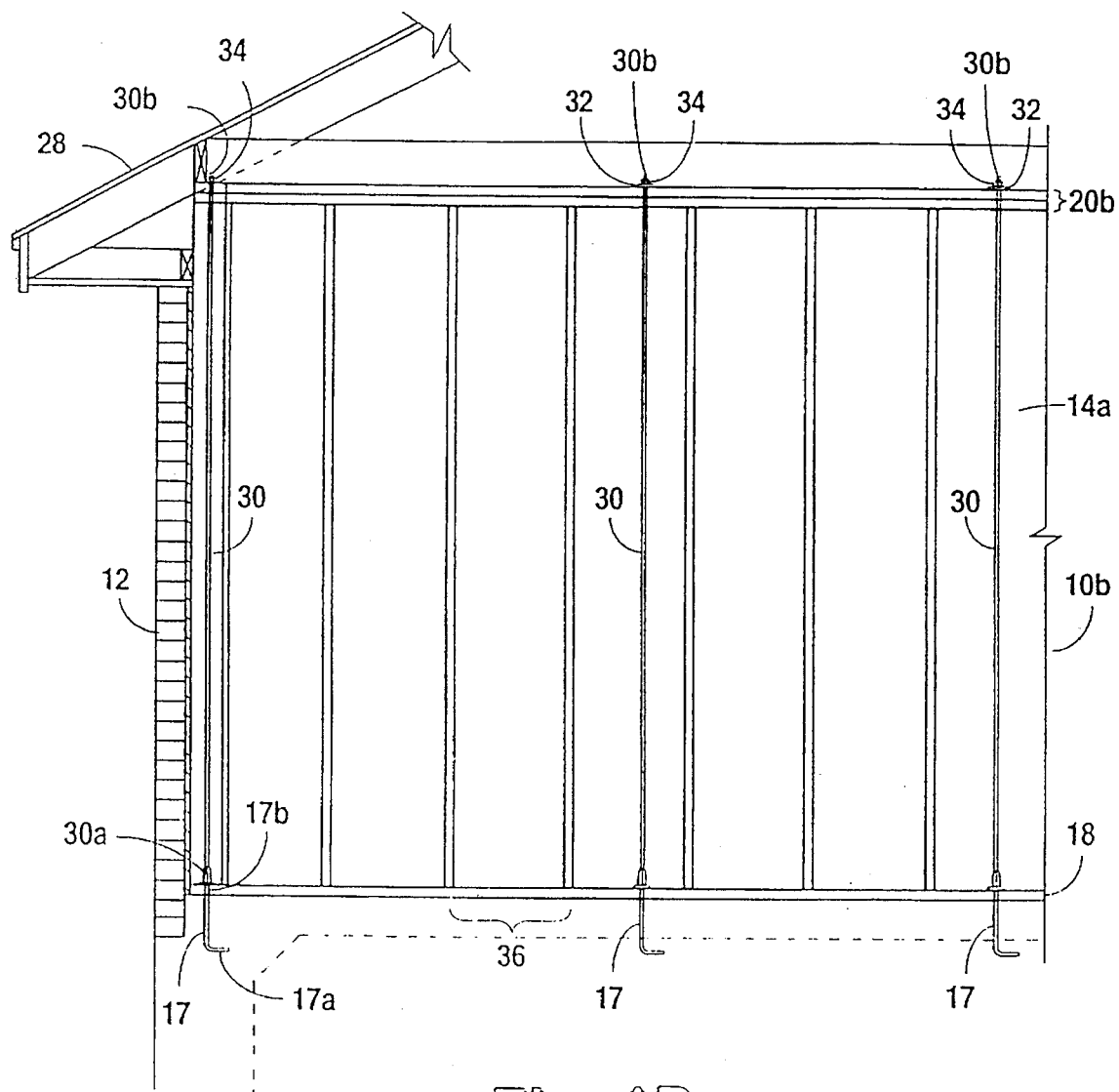
FIG. 1d is an elevational cut-away view of the method of Applicant's present invention featuring a typical one-story wooden frame dwelling.

All the building structures, the subject of Applicant's present invention, are anchored by foundation (16), typically concrete. As can be seen in FIGS. 1d, 2b, and 2c, anchor studs (18) generally 2 inches by 4 inches, are secured to the top surface of concrete foundation (16) with anchor bolt (17). Anchor bolt (17) can be seen to have an anchored end (17a) and a threaded end (17b) (See, also, FIG. 3c).

At the top of first floor stud walls (14a) are found first floor ceiling joists (20a) (see FIG. 1a). If a second story building utilizes the present method then second floor ceiling joist (20b) would be involved also, as well as beam (23b) as is set forth in more detail below (See FIG. 1a).

Figure 1B:
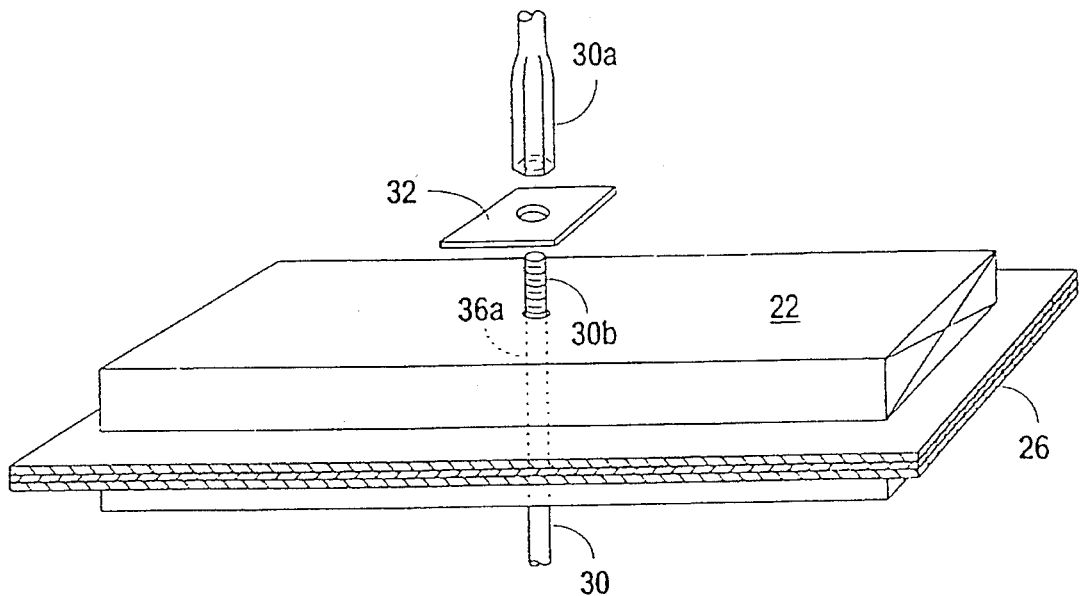
FIG. 1b and 1c is a symmetric detailed view of Applicant's method of anchoring across a 24 inch truss.

In both structures (10a) and (10b) are found the typical 2-inch×4-inch wall studs (24). Flooring (26) is illustrated in FIG. 1b. Roof (28) completes the typical building structures as illustrated in FIGS. 1a and 1d.

Thus, what is illustrated and described above is nothing more than typical one and two-story wooden frame structures. To reinforce such structures so as to better enable them to withstand the forces generated by high winds, Applicant provides tie rod (30) anchored to anchor bolt (17) and to foundation (16). Tie rods (30) trend vertically and are parallel to and coplanar with (laying within) stud walls (12), (14a) and (14b). Tie rods (30) have a socket end (female) (30a) having walls defining a threaded socket. A second end of the rod (30) is defined by threaded end (30b) (see FIG. 1b).

Tie rod (30) is typically rigid, between ½- and ⅝-inch in diameter, and made of corrosion-resistant steel. The socket end is dimensioned to threadably receive threaded end (17b) of anchor bolt (17) or threaded end (30b). The threaded end (30b) of tie rod (30) is dimensioned to receive either of socket end (30a) or washer (32) and nut (34). Washer (32) is defined to fit snugly over anchor bolts (17) and the shaft of rigid tie rod (30), and is generally made of ⅛-inch thick metal, about 3½ inches on a side, and square.

Turning now to FIG. 1a, it is seen that tie rod (30) of Applicant's present invention is designed to secure the separation of walls (14a) and (14b) with respect to foundation (16). Simply put, tie rods (30) will, when used according to Applicant's present invention, tend to resist any tensile forces tending to lift or separate floors (14a), (14b) or roof (28) from structures (10a) and (10b), achieving this result by anchoring the walls (14a) and (14b) to the foundation by the use of washers (32) secured in place by tie rods (30) and nuts (34) against horizontal beams.

As can be further seen in FIGS. 1a and 1d, the present method calls for anchoring walls (14a) and (14b) at every third or fourth stud wall gap (36) defined by adjacent studs (24) and typically 16 inches wide.

Figure 1C:
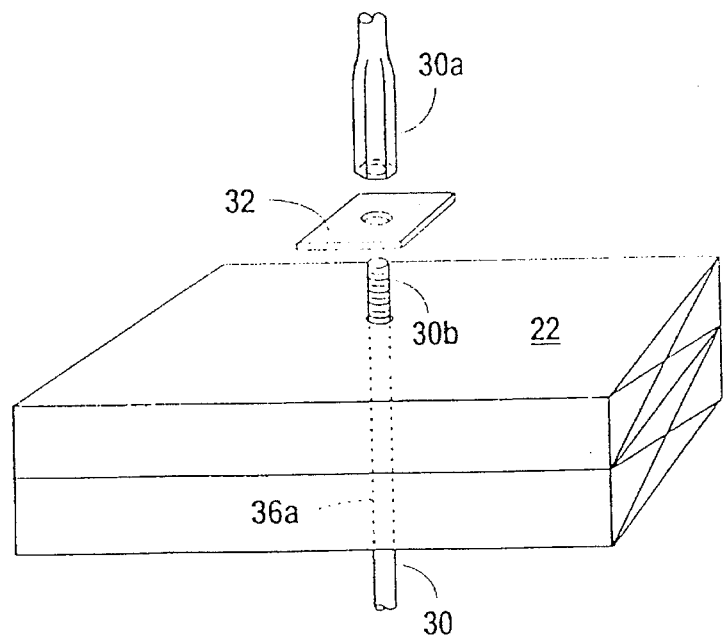

FIGS. 1b and 1c provide further details on how coupling of tie rod end (30b) of first floor tie rod (30) engages the top surface of second floor joists (22) securing washer (32) snugly against a 2×4 or other means defining horizontal beams or floor joists (22). As can be seen in FIGS. 1b and 1c, channel (36a) is required through the joists and is created by tools and methods well known in the trade.

FIGS. 1d and 2b illustrate the method of affixing threaded end (30b) to an anchored tie rod (30) by securing with nut (34) and washer (32) to threaded end (30b) at the top surface of ceiling joist (20b).

Figure 2A:
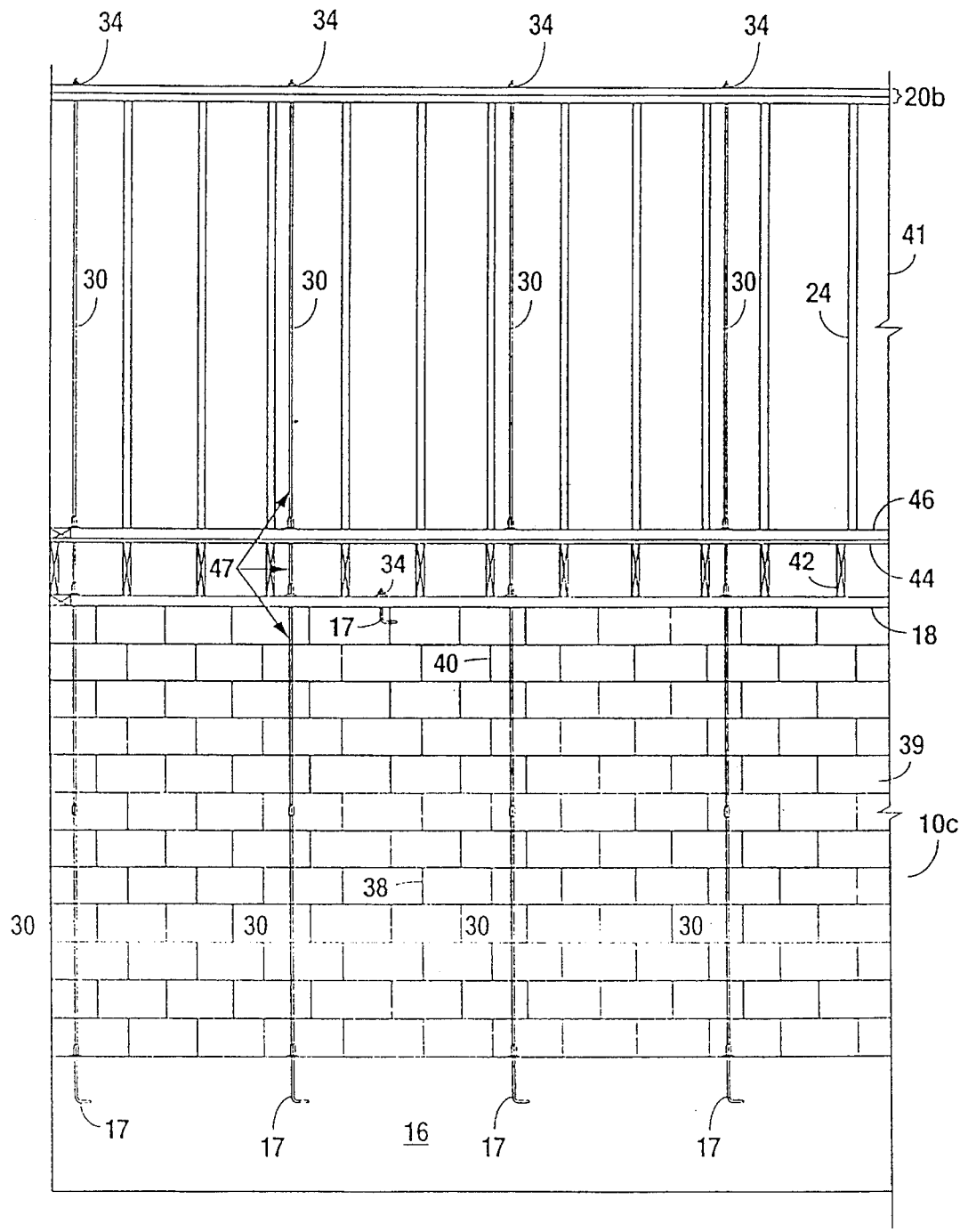
FIG. 2a is a cut-away elevational view of a wall section for a two-story building of concrete block and wooden frame.
Figure 2B:
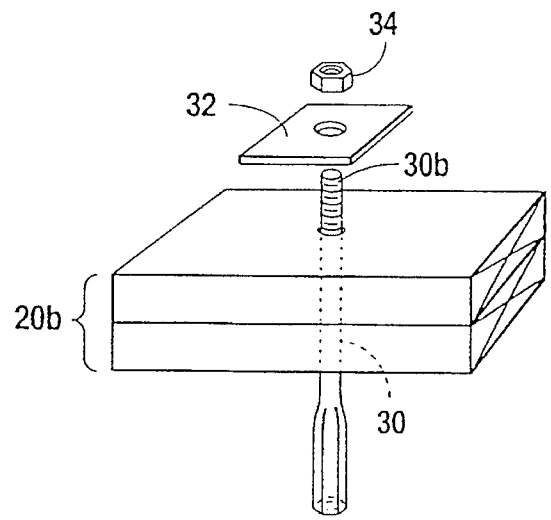
FIG. 2b is a symmetric detailed view of the method of anchoring to the foundation horizontal beams of the second floor of the dwelling.
Figure 2C:
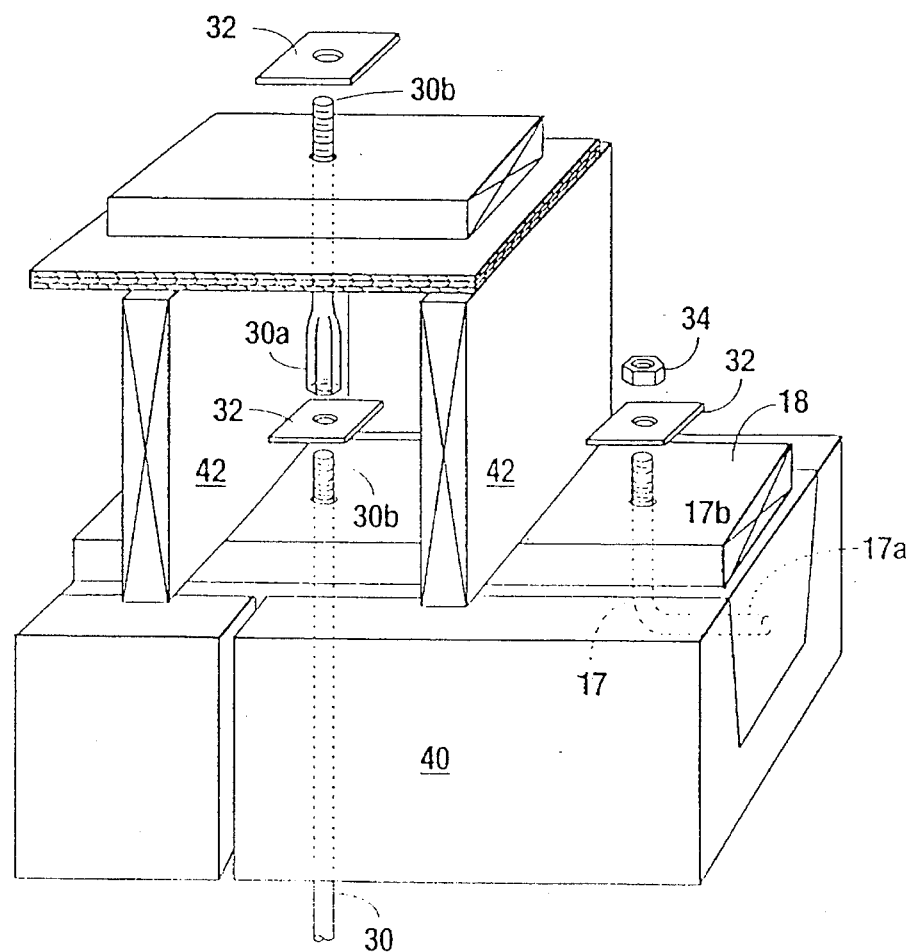
FIG. 2c is a symmetric detailed view of the second floor anchoring.

FIG. 2a illustrates a wall section through a two-story building where the first story is constructed of concrete block and the second story wood frame. While the details of Applicant's method differ slightly when applied to building structure (10c), the function is still the same—to tie through the use of vertical tie rods (30b) the anchor bolt (17) of the foundation to ceiling joist (20b) or other horizontal beam. Building (10c) has a concrete wall (38) defining first floor (39). At the top of first floor (39) is C.M.U. lintel bond beam (40). Anchor stud (18) is secured to bond beam (40). On top of the anchor stud—typically 2 inches by 4 inches—are located floor joists (42), typically 2 inches by 12 inches. Three-quarter-inch plywood subfloor (44) and 2-inch by 4-inch bottom plate (46) complete the partition between first floor (39) and second floor (41).

Turning now to the details of Applicant's method, it can be seen that anchor bolts may be secured to either concrete foundation (16) or through bond beam (40), or at both locations. Tie rod (30) is anchored to anchor bolt (17). To accommodate the tie rod, a channel is created through concrete block wall (38) by means known in the trade to extend through anchor stud (18).

A short tie rod (30) may be used to extend between the upper and lower surfaces of the floor joist (42) (see FIG. 2c). This short rod (30) ties the top of bottom plate (46) where washer (32) and end (30a) of the second floor tie rod (30) begins, to concrete foundation (16) through the first floor tie rod. The second floor tie rod (30) has end (30b) extending through second floor ceiling joist (20b) as illustrated in FIGS. 2a and 2b. It is seen how using vertical tie rods from foundation (16) through second ceiling joist (or other horizontal beam) (20b) provides a means of ensuring tensile force along the set of tie rods defined at numeral (47) to the foundation of the structure. Specifically, it is seen how tie rods of several different lengths can be joined together to maintain or increase the tension or separation forces of the building structure to the concrete foundation.

The length of tie rod (30) varies between 8 feet 1¾ inches, and 1 foot 3 inches. Typical sizes are 8 feet 1¼ inches, 4 feet 2⅞ inches, 2 feet 3¾ inches, and 1 foot 3 inches. These lengths correspond typically to the usual height differences between concrete foundation (16) and first and second story floor joist as well as differences between top and bottom of floor joists. Regardless of the length of tie rod (30), they are typically manufactured from ½-inch to ⅝-inch round steel. Socket end (30a) as well as threaded end (30b) typically have about 2 inches of thread. The longest rods, those over 4 feet 2⅞ inches in length, should have ⅝-inch thick shafts.

Figure 3A:
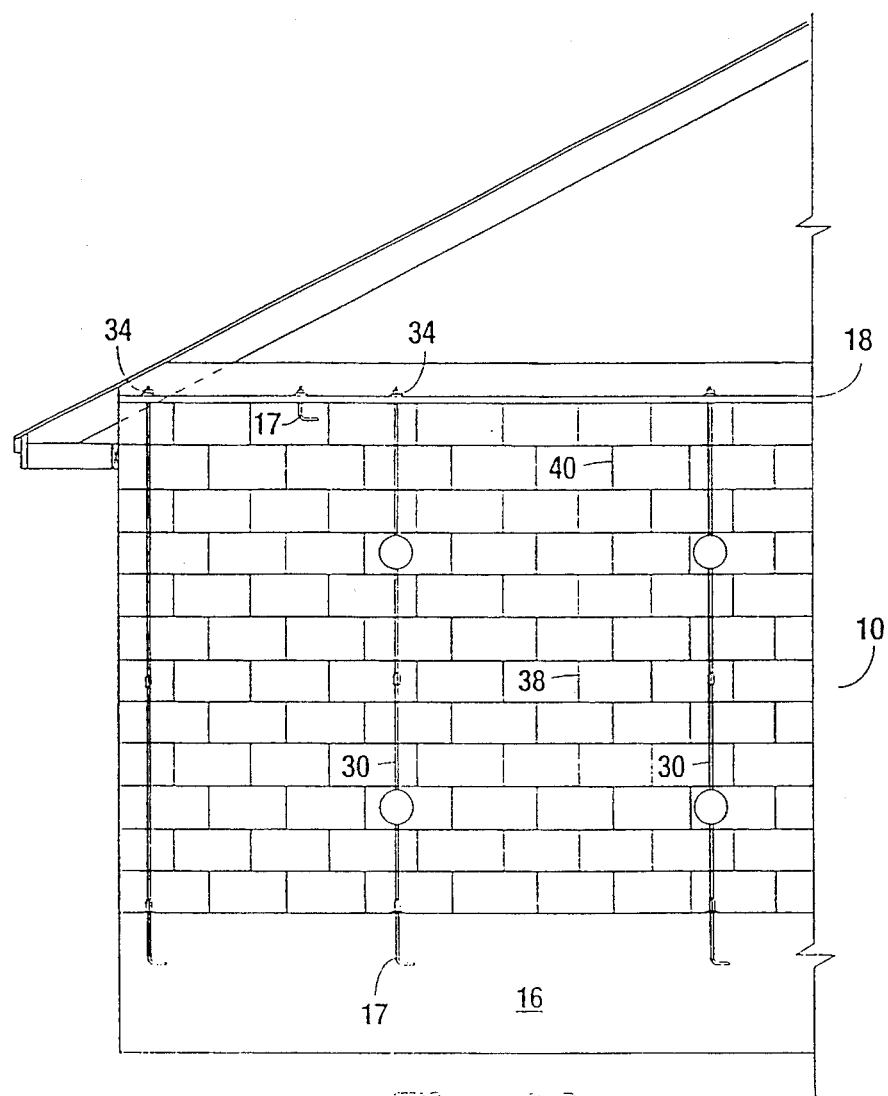
FIG. 3a is a side elevational view cut-away of a wall section of a concrete block wall building structure.
Figure 3C:
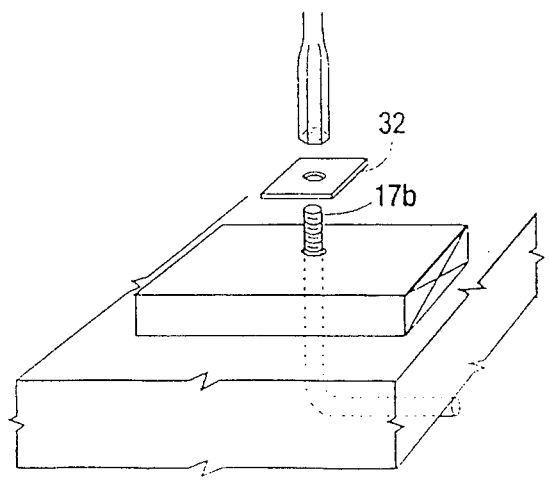
FIG. 3c is a symmetric view detailing anchoring to a concrete slab.
Figure 3B:
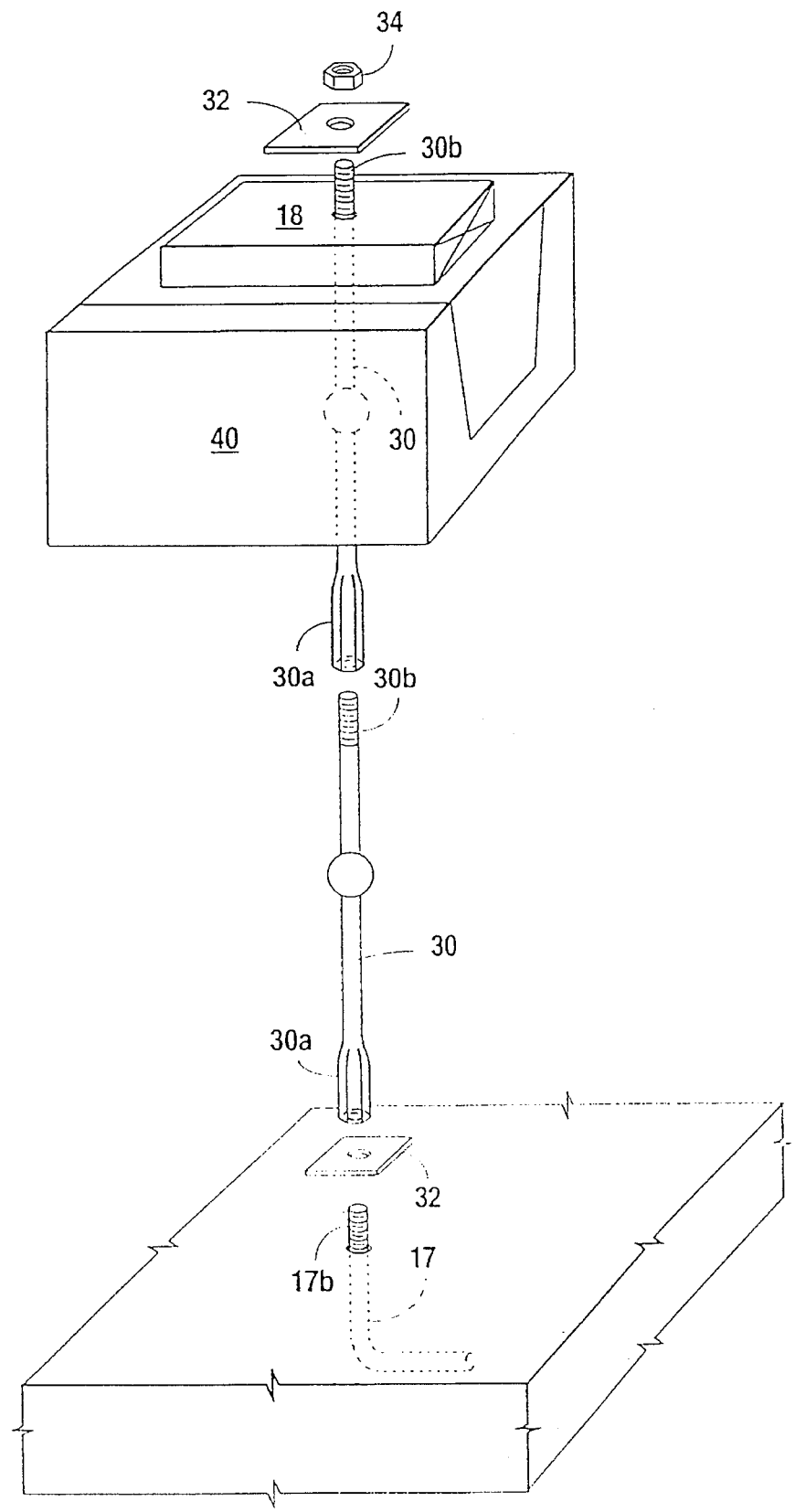
FIG. 3b is a symmetric detailed view of the masonry lintel illustrating Applicant's invention.
Figure 4A:
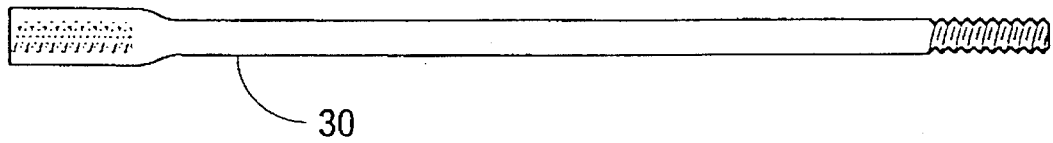
FIGS. 4a–d depict tie rods of the present invention.
Figure 4B:
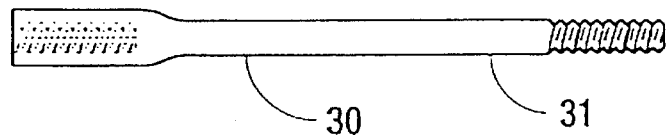
Figure 4C:
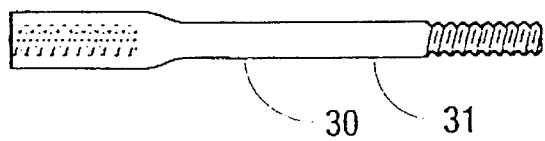
Figure 4D:
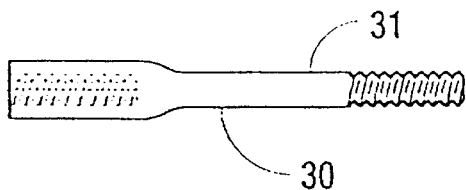

Turning now to FIG. 3a, a one-story concrete block wall of building (10d) is illustrated. As can be seen here, installation and use of tie rod (30) is similar to that illustrated in FIG. 2a. That is, tie rod (30) is tied to foundation (16) at anchor bolt (17). Tie rod (30)is aligned vertically upward through concrete block wall (38) until threaded end (30b) extends above anchor stud (18) where it is affixed with the washer and nut as set forth above. Details of the tie rod installation may be seen at FIG. 3b as well as referring back to FIG. 2c. These details reveal that use of tie rod (30) with a single story concrete block wall building structure as illustrated (10d) will provide for tensile forces anchored to foundation (16).

Figure 5A:
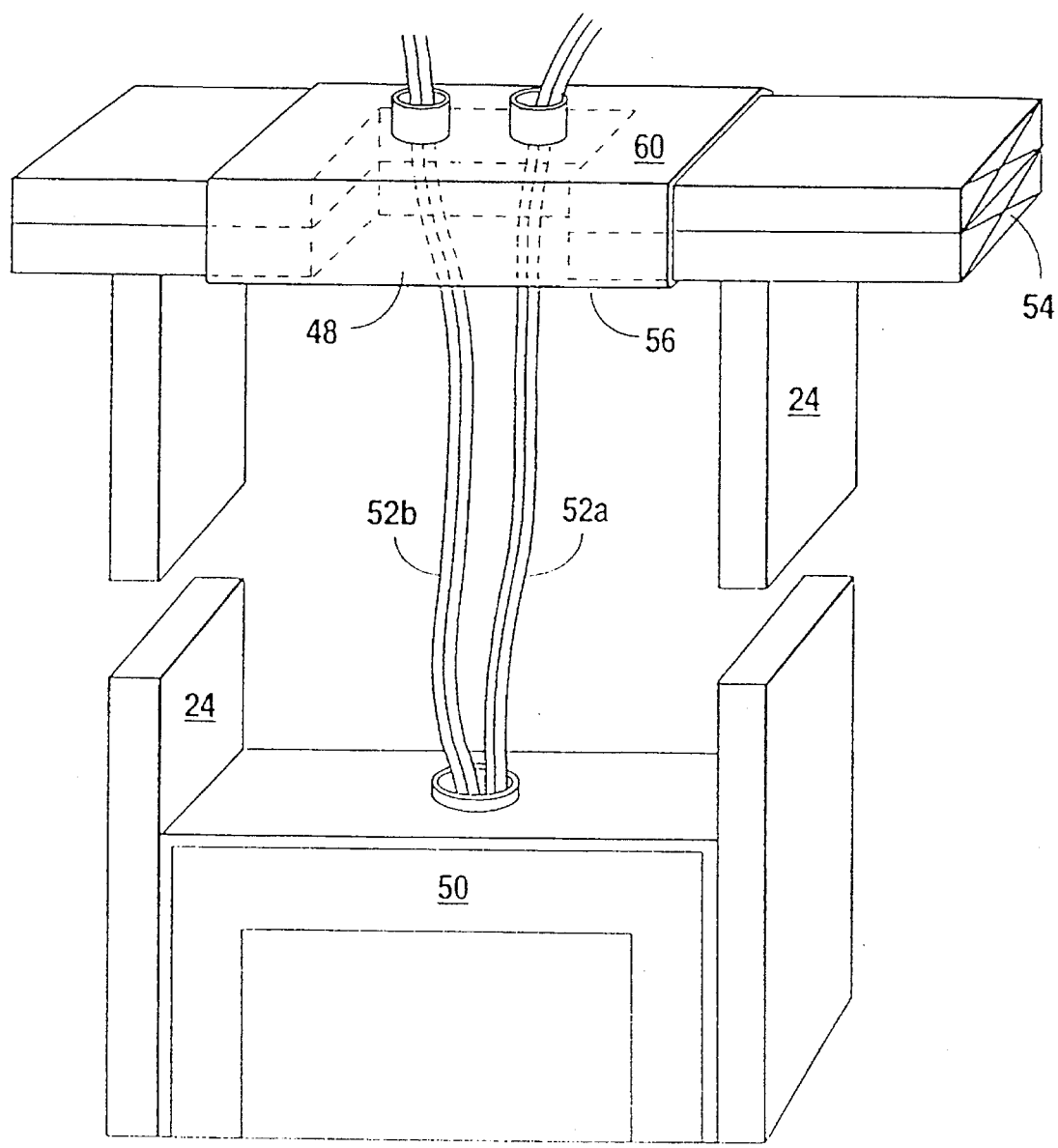
FIG. 5a is a symmetric view of a brace for a cut-out top plate.

FIGS. 5a–d, on the other hand, illustrate modifications to the wooden structures which utilize Applicant's present invention to help strengthen the wooden structure from destruction in the event of high wind. More particularly, FIGS. 5a and 5b illustrate the use of a brace for a top plate having cutout (48). These cutouts are frequently required when an electrical panel box (50) is located between studs (24). Cutout (48) is provided to allow electrical conduit (52a) and (52b) to extend past horizontal beams and throughout the house. Unfortunately, cutouts (48) produce a material weakness in horizontal beams (54), top plates, joists to any type of beam. Thus, Applicant provides a plate brace (56) to help strengthen the cutout beams (54). As can be seen in FIGS. 5a and 5b, brace (56) is shaped from 12 gauge metal plate or the like to form a generally C-shaped outline. Surfaces (58a) and (58b) are designed to extend across and past cutout (48) well into the solid wood portion of beam (54). Brace (56) can be secured to beam (54) by means of nails, screws or the like (60). It will be appreciated from FIGS. 5a and 5b that the dimensions of brace (56) in relation with the beam is designed to substantially enclose the cutout (48) of beam (54) while providing holes (62) for conduits (52a) and (52b) to run through. Again, the function of brace (56) is to strengthen the horizontal beams from separation under shear or compressive or tensile forces.

Other adaptations of Applicant's tie rod (30) may be seen in FIGS. 5c and 5d. In the embodiment features in FIGS. 5c and 5d, removed (nonanchored) end of tie rod (30) is modified to provide for a flattened portion (30c) in place of threaded end (30b). Flattened portion (30c) has channel (64) therethrough and is provided with a support flange (66) in the shape of an inverted "J" which will attach to flattened portion (30c) with pin (68) or other fastening means. Turning back to support bracket or flange (66), it is seen in FIG. 5d how tie rod (30) having modified end (30c) coupled through support bracket (66) may fit over a rafter (70) or floor joint or the like to provide resistance to tension forces. Thus, tie rod (30) can tie into rafters (70) through the use of a support bracket (66) rather than the washers and nuts disclosed above.

Applicant's method is applicable to any building structure. It provides for a multiplicity of vertical tie rods anchored at a first end to the foundation of the building. The removed end is anchored in any horizontal beam with a washer and a nut, to prevent vertical separation when the second beam undergoes tension forces. The tie rods should lie in the planes of the walls. Torque on the securing bolts (or support braces) should not load up the structure under compressive forces, but be merely snug.

Terms such as "left", "right", "up", "down", "bottom", "top", "front", "back", "in", "out" and the like are applicable to the embodiment shown and described in conjunction with the drawings. These terms are merely for the purposes of description and do not necessarily apply to the position or manner in which the invention may be constructed or used.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

I claim:

1. An improved wall for a wood frame building structure, the building structure having a foundation with a multiplicity of threaded anchor bolts projecting vertically upwards from a top surface thereof, a multiplicity of vertical, channel-free wood studs and a multiplicity of horizontal wood beams laying atop at least some of said multiplicity of channel-free, vertical wood studs, the multiplicity of horizontal wood beams having a multiplicity of channels therethrough, the improvement comprising:

a multiplicity of rigid metal tie rods, each of said rods having a first end and a second end, and a body between the first end and the second end, the first end having walls defining threaded sockets dimensioned to accept the threaded anchor bolts of the foundation of the wood frame building structure and the second end having threads thereon, said multiplicity of rigid metal tie rods spaced apart from and not enclosed by the vertical wood studs;

a multiplicity of tie rod end washers and fasteners, dimensioned for receipt over the second ends of said rigid metal tie rods, the washer exceeding the diameter of the channels wherein said tie rod end washers and fasteners are engaged to the rigid metal tie rod second ends such that they meet the top of the walls defining the channel of said horizontal beams in flush relation; and wherein at least a portion of the bodies of each of said multiplicity of rigid metal tie rods is not enclosed by channels.

2. The wall as set forth in claim 1, wherein at least one of said multiplicity of rigid metal tie rods is comprised of at least two sections, the at least two sections being removably joined between the first end and the second end of the rigid metal tie rod.

3. The wall as set forth in claim 2, wherein the sections of the at least one rigid metal tie rod are threadably joined.

4. The wall as set forth in claim 4, wherein the sections are joined at the top surface of at least one of said horizontal wooden beams at the channel therethrough and further comprising a washer for flush engagement against the top of the at least one of said horizontal wooden beams in a non-compressive relation.

5. The wall as set forth in claim 4, further comprising anchor bolt washers for receipt onto the anchor bolts between the foundation of the wood frame building structure and the first end of said rigid metal tie rod.

6. The wall as set forth in claim 1, wherein said multiplicity of rigid metal tie rods lay coplanar to said multiplicity of vertical wall studs.

\* \* \* \* \*